United States Patent Office 2,823,162
Patented Feb. 11, 1958

2,823,162

4,4'-DINITROCARBANILIDE COMPOSITION USEFUL AGAINST COCCIDIOSIS

Robert C. O'Neill, New York, N. Y., and Arthur J. Basso, Rahway (Colonia), N. J., assignors to Merck & Co., Inc., Rahway, N. J., a corporation of New Jersey No Drawing. Application November 23, 1955
Serial No. 548,778

3 Claims. (Cl. 167—53.1)

This invention relates to the treatment of coccidiosis.

This is a continuation-in-part of our copending application, Serial No. 341,821, filed March 11, 1953, now Patent 2,787,574.

The widespread disease complex commonly called "coccidiosis" is caused by several species of protozoan parasites of the genus Eimeria. Thus the species *E. tenella* is responsible for a severe and frequently fatal infection in the cecum, or blind gut, of chickens. Furthermore, other species of Eimeria and particularly *E. acervulina, E. necatrix, E. maxima,* and *E. brunetti* cause serious intestinal infections in poultry. When left untreated coccidiosis causes extensive losses to poultry raisers. Accordingly, the control of coccidiosis is essential to successful poultry raising.

The primary object of this invention is to prevent the development and spread of coccidiosis. Subsidiary objects will be apparent from the detailed description hereinafter set forth.

In accordance with the present invention, compositions comprising 4,4'-dinitrocarbanilide—also sometimes described as 1,3-bis(4-nitrophenyl) urea—and represented by the following formula

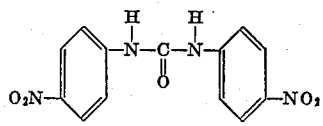

combined with an inert carrier, have been found effective when administered orally to poultry, to prevent the development and spread of coccidiosis.

4,4'-dinitrocarbanilide is a known compound and may be prepared in various manners, one of which is described in Organic Syntheses, Collective Volume 1, pages 453 thru 455, published in 1941.

The composition of this invention comprises 4,4'-dinitrocarbanilide combined with an inert carrier or diluent. Such a composition is conveniently produced by intimately dispersing the active ingredient throughout a carrier. The carrier or diluent may be either liquid or solid. Liquid dispersions can be prepared satisfactorily by using emulsifiers and surface active agents. Any solid can be used as a carrier which is inert to the active compound and which can be administered to animals with safety. Examples of suitable carriers are ground oyster shells, attapulgus clay, and edible vegetable materials such as commercial animal and poultry feeds, urea, corn meal, ground corn, citrus meal, fermentation residues and distillers dried grains. The active ingredient is conveniently dispersed in a solid carrier by conventional methods such as stirring, tumbling, and grinding. In this manner, by selecting different carriers and by altering the ratio of carrier to active ingredient, compositions of varying concentration can be prepared.

Premixes may be prepared in the same general manner. Premixes contain the active ingredients in a carrier, but in a greater concentration than is used in the poultry feed. A premix is a convenient manner of supplying the composition to the poultry raiser, who further dilutes the concentration of the active composition by mixing the premix with the poultry feed.

The amount of 4,4'-dinitrocarbanilide required for effective prophylactic control of coccidiosis is very low. When 4,4'-dinitrocarbanilide is administered by incorporation in the normal poultry diet, prophylactic control of coccidiosis is secured when about 0.02% to about 0.5% of the food consumed is 4,4'-dinitrocarbanilide. The preferable range is from 0.02% to 0.15%. The higher concentrations may be administered to control extremely virulent outbreaks of the disease.

Premixes contain from about 10% to about 60% of 4,4'-dinitrocarbanilide dispersed in an inert carrier.

The 4,4'-dinitrocarbanilide may be treated to disperse it on the surface of an adsorbent such as diatomaceous earth, before adding it to the premix or the poultry feed.

The 4,4'-dinitrocarbanilide used in the compositions of this invention may be in the physical form in which it is produced by chemical synthesis, provided, of course, that when 4,4'-dinitrocarbanilide is used in a solid carrier, it is not caked but a powdery or granular mass that can be readily dispersed in the carrier. The 4,4'-dinitrocarbanilide may be milled to reduce its particle size, before mixing it with the carrier. The preferred particle size is below 50 microns, and more particularly from 1 to 15 microns, although the particle size may be as large as about 100 microns.

The coccidiostatic activity of 4,4'-dinitrocarbanilide was experimentally demonstrated according to the following tests:

Groups of 10 two-week old chicks were fed a mash feed containing from 0.02% to 0.15% of a 4,4'-dinitrocarbanilide uniformly dispersed therein. After existing on the diet for 24 hours, each chick was inoculated with 50,000 sporulated oocysts of *E. tenella*. In addition, groups of 10 chicks were also infected but fed a normal diet, free of 4,4'-dinitrocarbanilide, and so used as positive controls. After the diets were administered for eight days (i. e., seven days after inoculation), the tests were terminated. In addition to recording the mortality experienced during the test, the surviving birds, after being weighed, were sacrificed and the occyst count (i. e. the number of parasites of *E. tenella* remaining), in those survivors was determined by examining the infected organs microsopically.

The following Table I summarizes the tests and the results obtained. The letters DNC used therein is a short reference to 4,4'-dinitrocarbanilide.

TABLE I

*Administration of 4,4'-dinitrocarbanilide in feed of chicks*

| Test No. | | Percent in diet | Percent Mortality | | Number of oocysts ×10⁶ in surviving birds | | Percent weight gain of surviving birds | | Notes |
|---|---|---|---|---|---|---|---|---|---|
| | | | Untreated | Treated | Untreated | Treated | Untreated | Treated | |
| 1 | a | 0.05 | 50 | 10 | 6.6 | 0.4 | not weighed | not weighed | |
|   | b | 0.1 | 45 | 0 | 7.8 | 0.2 | | | |
| 2 | a | 0.025 | 40 | 20 | 34 | 29 | 45 | 54 | |
|   | b | 0.05 | 40 | 0 | 34 | 28 | 45 | 66 | |
|   | c | 0.1 | 40 | 0 | 34 | 20 | 45 | 60 | |
| 3 | a | 0.05 | 30 | 0 | 24 | 1.6 | 44 | 73 | |
|   | b | 0.1 | 40 | 0 | 18 | 0.4 | 35 | 66 | |
| 4a | | 0.1 | 30 | 10 | 32 | 3 | 12 | 30 | DNC thru 40 mesh. |
| 5a | | 0.5 | 40 | 0 | 44 | 5.5 | 12 | 43 | DNC 5–15μ. |
| 6a | | 0.1 | 30 | 10 | 32 | <0.1 | 12 | 22 | DNC 3–5μ. |
| 7a | | 0.15 | 50 | 0 | 33 | 4.6 | –2 | 53 | DNC 1–3μ. |
| 8 | a | 0.1 | 11 | 0 | 32 | 1.1 | 25 | 40 | DNC micronized. |
|   | b | 0.15 | 50 | 0 | 33 | 0.6 | –2 | 64 | |
| 9 | a | 0.02 | 10 | 0 | 36 | 3 | 21 | 42 | DNC dispersed on Supercel. |
|   | b | 0.04 | 10 | 0 | 36 | 0.2 | 21 | 38 | |

The following examples describe several specific premixes which are satisfactory for incorporating the 4,4'-dinitrocarbanilide in the poultry feed, and also describe the methods of dispersing the 4,4'-dinitrocarbanilide on Supercel for the 4,4'-dinitrocarbanilide used in Test 9 of Table I. These examples are illustrative and are not to be considered as limiting the invention.

EXAMPLE 1.—PREMIX

To prepare 1,000 pounds of one feed premix, the following is used:

300 pounds of 4,4'-dinitrocarbanilide (through 200 mesh screen)
175 pounds of corn distillers dried grains (through 30 mesh screen)
455 pounds of wheat shorts (30–80 mesh)
70 pounds of dried vitamin $B_{12}$ fermentation solubles (30–80 mesh)

The total amounts of wheat shorts and fermentation solids, and about 150 pounds of corn grains are mixed, followed by the 4,4'-dinitrocarbanilide and the remainder of the corn grains. After mixing for about two hours, the material is ready for packaging.

The poultry raiser mixes this premix with the feed for the poultry in such proportions as to give the desired concentration of 4,4'-dinitrocarbanilide in the feed. For example, one pound of this premix mixed in with 600 pounds of feed produces a concentration of 0.05% in the feed.

EXAMPLE 2.—PREMIX

To prepare 100 pounds of another feed premix, the following is used:

25 pounds of 4,4'-dinitrocarbanilide (through 200 mesh screen)
18.8 pounds of corn distillers dried grain (through 30 mesh)
48.7 pounds of wheat shorts (30–80 mesh)
7.5 pounds of dried vitamin $B_{12}$ fermentation solubles (30–80 mesh)

The total amounts of wheat shorts and fermentation solids, and about 15 pounds of corn grain are mixed, followed by the 4,4'-dinitrocarbanilide and the remainder of the corn grains. After mixing for about two hours, the material is ready for packaging.

One pound of this premix mixed in with 500 pounds of feed produces a concentration of 0.05% of 4,4'-dinitrocarbanilide in the feed.

EXAMPLE 3.—PREMIX

To prepare 100 pounds of another feed premix, the following is used:

40 pounds of 4,4'-dinitrocarbanilide (through 200 mesh screen)
10 pounds of dextrin
10 pounds of salt (sodium chloride)
40 pounds of limestone The ingredients are thoroughly mixed by grinding or tumbling, after which about 10 pounds of water is added. After mixing, the resulting mass is dried at about 50° C. and pulverized, after which the material is ready for packaging.

One pound of this premix mixed in with 800 pounds of feed produces a concentration of 0.05% of 4,4'-dinitrocarbanilide in the feed.

EXAMPLE 4.—PREMIX

To prepare 100 pounds of another feed premix, the following is used:

60 pounds of 4,4'-dinitrocarbanilide (through 200 mesh screen)
39.5 pounds of urea
0.5 pound of free flowing calcium silicate, such as Santocel The ingredients are thoroughly mixed, as by grinding or milling, after which the material is ready for packaging.

One pound of this premix mixed in with 1200 pounds of feed produces a concentration of 0.05% of 4,4'-dinitrocarbanilide in the feed.

EXAMPLE 5.—PREMIX

To prepare 1,000 pounds of another feed premix, the following is used:

100 pounds of 4,4'-dinitrocarbanilide (through 200 mesh screen)
219 pounds of corn distillers dried grains (through 30 mesh screen)
600 pounds of wheat shorts (30–80 mesh)
81 pounds of dried vitamin $B_{12}$ fermentation solubles (30–80 mesh)

The total amounts of wheat shorts and fermentation solubles, and about 190 pounds of corn grains are mixed, followed by the 4,4'-dinitrocarbanilide and the remainder of the corn grains. After mixing for about two hours, the material is ready for packaging.

One pound of this premix mixed in with 200 pounds of feed produces a concentration of 0.05% of 4,4'-dinitrocarbanilide in the feed.

EXAMPLE 6.—DNC DISPERSED ON SUPERCEL 31.5 grams of 4,4'-dinitrocarbanilide is dissolved at room temperature in 120 ml. of concentrated sulfuric acid. This solution is added dropwise to a vigorously stirred suspension of 120 grams of Supercel (a form of diatomaceous earth) in 1500 ml. of water, the addition consuming 50 minutes. The flask is washed with 20 cc. of sulfuric acid and the wash added to the mixture. The resulting mixture is stirred for two hours, and then made slightly alkaline by the addition of concentrated ammonium hydroxide (about 370 ml.), with stirring and cooling to maintain the mixture at about room temperature. After stirring for 20 more minutes, the solid is collected by vacuum filtration, washed well with two 500 cc. portions of water, then with 500 cc. of methanol. The solid is then dried at 60° C. The resulting product contains about 19.8% 4,4'-dinitrocarbanilide by weight, and is added to premixes and to feed upon the basis of this content.

This product, when added to feed, corresponds to the composition used in Test 9 of Table I.

EXAMPLE 7.—DNC DISPERSED ON SUPERCEL

Another method of obtaining a dispersion of 4,4'-dinitrocarbanilide on Supercel is by having Supercel present in the reaction mixture when 4,4'-dinitrocarbanilide is produced.

Thus, Supercel is added to a stirred and heated solution of 1 molar equivalent of p-nitroaniline and 1 molar equivalent of p-nitrophenylisocyanate in a dry, inert organic solvent such as toluene. The product is insoluble in the solvent, and is collected by vacuum filtration, washed and dried.

Compositions containing 4,4'-dinitrocarbanilide may also, if desired, include other medications useful for the treatment of coccidiosis, such as arsenicals, 3,3'-dinitrodiphenyldisulfide, sulfaquinoxaline, and other therapeutically effective sulfa compounds. As an example, a feed for use in the control of coccidiosis in poultry includes, in addition to the normal feed constituents (which serve as a carrier), 0.05% of 4,4'-dinitrocarbanilide and 0.05% of sulfaquinoxaline.

What is claimed is:

1. A composition of matter effective in the control of coccidiosis in poultry which comprises a poultry feed in solid particle form, and from about 0.02% to about 0.5% by weight of 4,4'-dinitrocarbanilide intimately dispersed therein.

2. A composition of matter effective to prevent the development and spread of coccidiosis in poultry which comprises a poultry feed in solid particle form nutritionally adequate per se, and from about 0.02% to about 0.15% by weight of 4,4'-dinitrocarbanilide intimately dispersed therein.

3. A premix for incorporation in a poultry feed to control coccidiosis which comprises a poultry-ingestable material in solid particle form serving as a carrier, and 4,4'-dinitrocarbanilide intimately dispersed in said carrier, the proportion of said 4,4'-dinitrocarbanilide being from about 10% to about 60% by weight.

References Cited in the file of this patent

Thompson: Chem. Abstracts, vol. 41, 1947, pp. 3902 and 3910a.